March 14, 1944.    H. P. WILLIAMS    2,344,070
RADIO SYSTEM FOR LANDING AIRCRAFT
Filed April 9, 1942
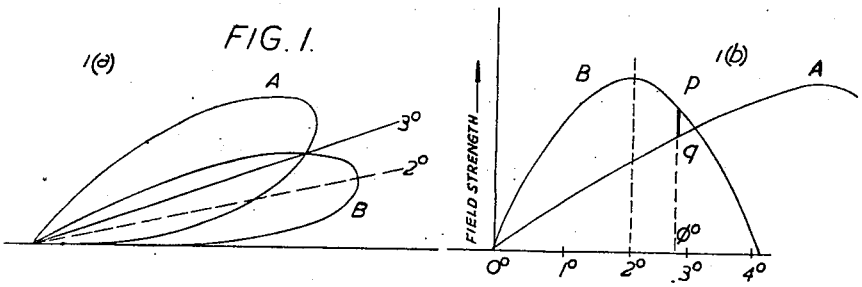
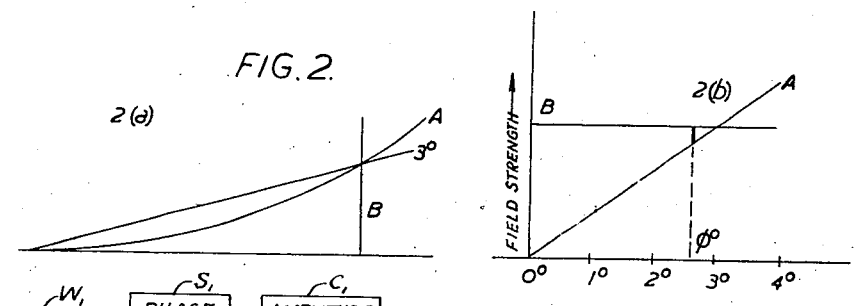
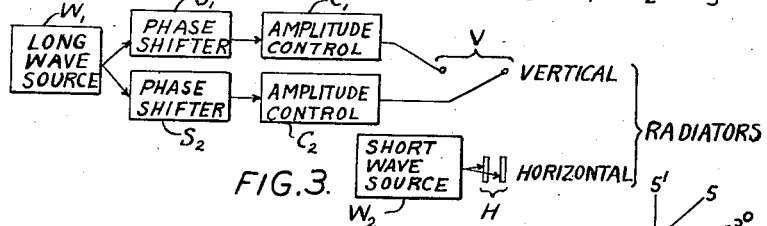
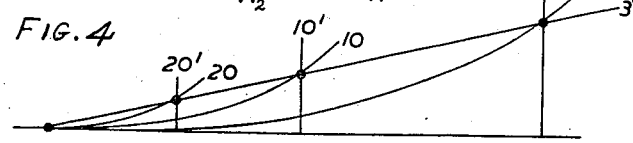
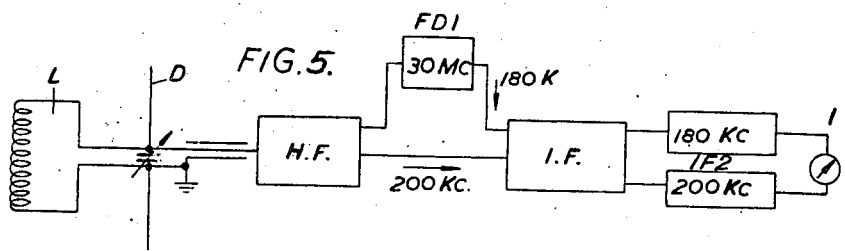
INVENTOR
H. P. Williams
BY
ATTORNEY Patented Mar. 14, 1944

2,344,070

UNITED STATES PATENT OFFICE 2,344,070

RADIO SYSTEM FOR LANDING AIRCRAFT

Herbert Paul Williams, London, England, assignor to International Standard Electric Corporation, New York, N. Y.

Application April 9, 1942, Serial No. 438,297
In Great Britain January 2, 1941

6 Claims. (Cl. 250—11)

This invention relates to a radio glide path system for landing aircraft of the kind in which an intersecting pattern is given by the radiation of two different frequencies. It is therefore a comparison method with all the accompanying advantages in receiver design.

The transmitters producing the two frequencies are monitored on the ground so that their outputs have a constant ratio. This is much more reliable and simpler than systems of the kind in which each aeroplane is equipped with a receiver of the field strength measuring type.

According to the invention one of the comparison frequencies is radiated on a short wavelength (e. g. 30 mc.) said radiation giving a square law pattern and the other comparison frequency is transmitted on a relatively long wavelength (e. g. 100 to 400 kc.) the field strength contour lines of which long wave radiation are approximately vertical and vary inversely with the distance from the transmitter.

The following advantages are claimed for the system to be described:

1. A highly stabilised receiver is not needed.
2. Although the system employs a comparison method, the shape of the glide path is not a straight line into the aerial system, but can be made to approach the ideal shape.
3. The shape of the glide path is adjustable.
4. Centimetre wavelengths are not necessary.

The short wave radiation may be of any frequency (from say 9 metres downwards) provided a square law polar diagram is produced over the angle of glide.

The principle of operation of the system according to the invention will now be described with reference to the drawing in which Figs. 1, 2 and 4 show field strength curves which will be referred to, Fig. 3 is a plan of radiators, and Fig. 5 shows a schematic diagram of a receiver.

Let us consider first the normal known type of overlapping pattern produced by two short wave transmitters as shown in Fig. 1. The plot of field strength against angle with the ground at a given fixed distance is shown in Fig. 1b.

The difference in voltage from the two radiations A and B at an angle $\phi$ is given by $pq$. There is great difficulty in producing a satisfactory beam of the type shown in curve B, and furthermore, we are immediately restricted to centimetre wavelengths.

If we are prepared to halve the differentiation between curves A (square law) and B by making B constant, then the required pattern for B may be produced by a simple vertical radiator, the patterns being as shown in Fig. 2 in which Figs. 2a and 2b are curves corresponding to Figs. 1a and 1b respectively.

Unfortunately we cannot radiate a short wavelength from the vertical radiator since the ground attenuation is not linear with distance (i. e. the polar diagram near the ground is not vertical), and in any case would vary considerably with weather conditions.

By employing, however, for B a frequency lying between 100 to 400 kc., the field strength contour lines are very nearly vertical and vary inversely with distance from the source.

Since we are only concerned with distance up to three miles from the transmitter, the required regularity of the vertical contour lines is more easily achieved.

The long wave antenna consists of one or more vertical radiators, shown as two radiators V in Fig. 3. They are about 30' high to conform with aerodrome regulations. As a result their efficiency is low, but this point is not vital since in any case the amount of radiation should be kept as low as possible to avoid interference.

The short wave antenna system H fed from the source $W_2$, is one which radiates horizontally polarised waves so as to give a square law pattern with the ground. The actual sharpness of the lobe does not matter very much.

If the long and short wave radiators are situated in approximately the same place, a straight line glide path terminating at the antenna system results as indicated in Fig. 4.

By off-setting the long wave antenna and more especially by having two vertical radiators V, as in Fig. 3, spaced a distance apart and fed with currents from the long wave source $W_1$ adjusted by phase shifters $S_1$ and $S_2$, to have a predetermined phase relationship and adjusted by the amplitude controllers $C_1$ and $C_2$ to have a predetermined current strength ratio, the glide path may be made to approach closely to the ideal shape. Moreover, it is obvious that the shape may be adjusted if more than one antenna be employed.

The effect on the radiation patterns of variation of this distance and of these phase and current relationships is well known to those versed in the art and need not be described herein.

Since the radiation B emitted is on a very long wavelength, the off-setting is not critical to an uneven ground or to small obstacles.

Receiver circuit arrangements for use in the system according to the invention are shown in Fig. 5. L is a long wave frame aerial for say a 200 kc. radiation B and D is a short-wave dipole for say a 30 mc. radiation A. The pickups from both antennas are amplified in a high-frequency amplifier H. F. The short wave radiation A is subjected to a filter and frequency changer FD1 and changed down to a frequency (e. g. 180 kc.) near that of the long wave radiation B. Both waves are then amplified in a common intermediate frequency amplifier IF and separated and detected in filters and detectors IF2. I is a comparison meter.

It will be seen that both radiations are amplified by the same valves and therefore changes in receiver gain do not affect the comparison (assuming the tuned circuits remain constant, which they would do in comparison with valve variations). It is also permissible to add automatic volume control to the receiver.

A monitoring equipment for keeping the output of the two transmitters in a constant ratio is required. This could be set up at say 50 to 100 yards from the transmitters and need not have any amplifying valves.

The simplest method of controlling the outputs from the two transmitters would be to regulate the percentage modulation of the short wave transmitter so that it compensates for variations in the radiation from the long wave transmitter. The modulation of the short wave transmission with the long wave radiation would be compared by means of tuned circuits arranged to act differentially as in automatic frequency control circuits.

Since the monitoring is all done on the ground, this may be made very accurate and reliable.

What is claimed is:

1. In a radio glide path system for guiding the landing of aircraft, means, including a first transmitter for radiating a long wave radiation pattern in which the wave is approximately vertically polarized and the field strength varies inversely as the distance from the transmitter, and means including a second transmitter in approximately the same place as said first transmitter, for radiating a short wave pattern in which the wave is horizontally polarized and the field strength varies inversely as the square of the distance from the transmitter, said transmitters being adjusted to produce overlapping patterns containing a glide path defined by a line on which said long and short waves have a predetermined comparative strength for guiding the aircraft.

2. In a radio glide path system according to claim 1, the combination in which a plurality of vertical antennae are combined for radiating said vertically polarized wave.

3. In a radio glide path system according to claim 1, the combination in which said long wave transmitter includes two vertical antennae spaced apart from each other, and means are connected with said antennae for controlling the relative phase and strength of current fed to said antennae for adjusting the effective portion of said long wave radiation pattern with respect to said short wave pattern along said glide path.

4. In a radio glide path system according to claim 1, the combination in which said long wave transmitter is offset from said short wave transmitter for adjusting the effective portion of said long wave radiation with respect to said short wave pattern along said glide path.

5. In a radio glide path system according to claim 1, the combination in which receiving means are provided for indicating the relative strength of said long and short waves along said glide path, said receiving means including a frame aerial for receiving said long waves and a dipole for receiving said short waves, said aerial and dipole being positioned for reception of said waves in their respective planes of polarization, high frequency amplifying means responsive to the waves received by said aerial and dipole, means responsive to the output of said amplifying means for separately detecting the energies corresponding respectively to the long wave received on said aerial and the short wave received on said dipole, and means responsive to the output of said detecting means for indicating a comparison of the values of said respective separately detected energies.

6. A radio system for providing an aircraft landing glide path comprising means including a short wave transmitter for radiating a short wave pattern in which the wave is horizontally polarized and the field strength varies inversely as the square of the distance from the transmitter and a long wave transmitter located immediately adjacent the short wave transmitter and radiating a long wave pattern in which the wave is vertically polarized and the field strength varies inversely as the distance from the transmitter, the long wave transmitter including two vertical radiators offset from the short wave transmitter and arranged to produce a directional pattern overlapping the pattern of the radiation from the short wave transmitter, producing a glide path defined by a line on which said long and short waves have a predetermined comparative strength for guiding the aircraft.

HERBERT PAUL WILLIAMS.